(No Model.)  W. L. CROUCH.  5 Sheets—Sheet 2.
GAS ENGINE.

No. 574,670. Patented Jan. 5, 1897.

(No Model.)  5 Sheets—Sheet 4.

W. L. CROUCH.
GAS ENGINE.

No. 574,670.  Patented Jan. 5, 1897.

Witnesses  Inventor
Walker Lee Crouch
Attorneys (No Model.) 5 Sheets—Sheet 5.
W. L. CROUCH.
GAS ENGINE.

No. 574,670. Patented Jan. 5, 1897.

Witnesses
Jno. G. Hinkel.

Inventor
Walker Lee Crouch
by Foster Freeman
Attorneys

UNITED STATES PATENT OFFICE.

WALKER LEE CROUCH, OF NEW BRIGHTON, PENNSYLVANIA, ASSIGNOR TO THE PIERCE-CROUCH ENGINE COMPANY, OF SAME PLACE.

GAS-ENGINE.

SPECIFICATION forming part of Letters Patent No. 574,670, dated January 5, 1897.

Application filed November 30, 1895. Serial No. 570,665. (No model.)

*To all whom it may concern:*

Be it known that I, WALKER LEE CROUCH, a citizen of the United States, residing at New Brighton, in the county of Beaver and State of Pennsylvania, have invented certain new and useful Improvements in Gas-Engines, of which the following is a specification.

This invention relates to gas-engines wherein the piston is propelled by the explosion of explosive charges of gas and air introduced into the working cylinder; and it is the object of the invention to improve the construction and arrangement of the parts and to simplify and render them certain of operation and not liable to get out of order under varying conditions, as hereinafter more fully pointed out.

Figure 1:
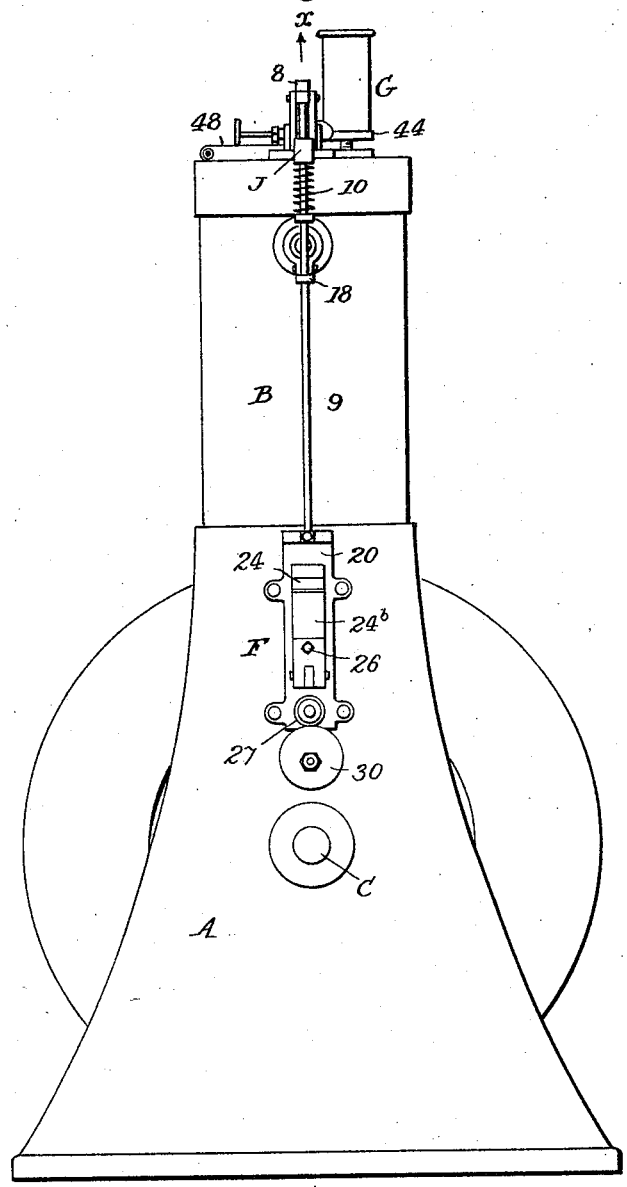
Figure 2:
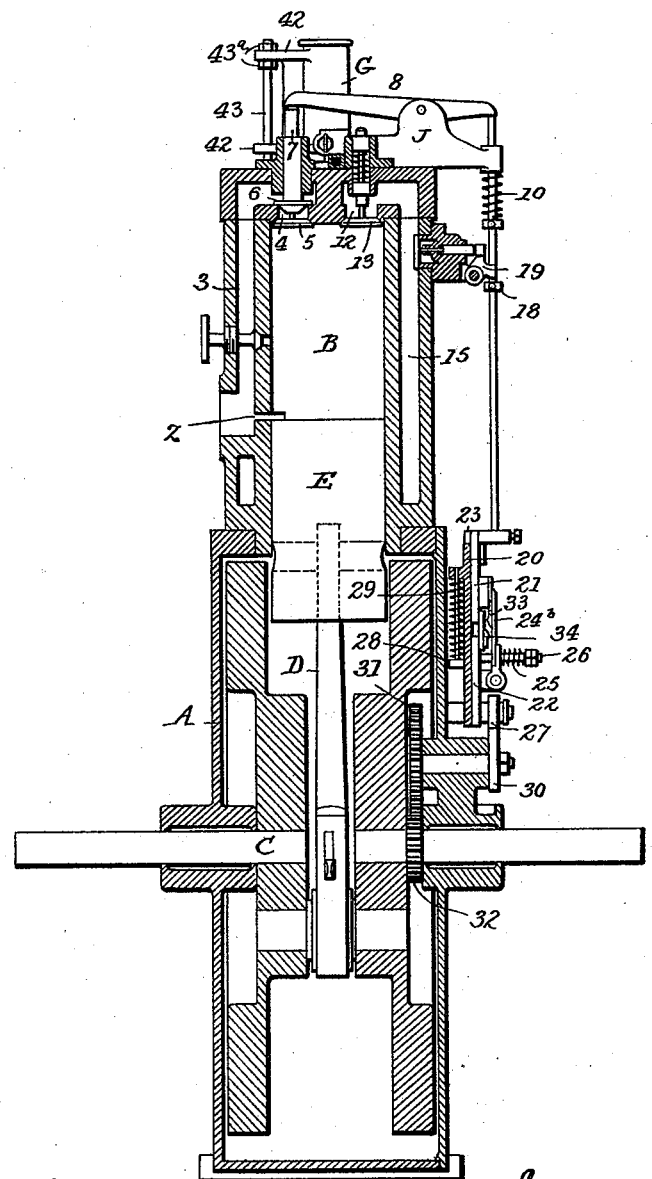
Figure 3:
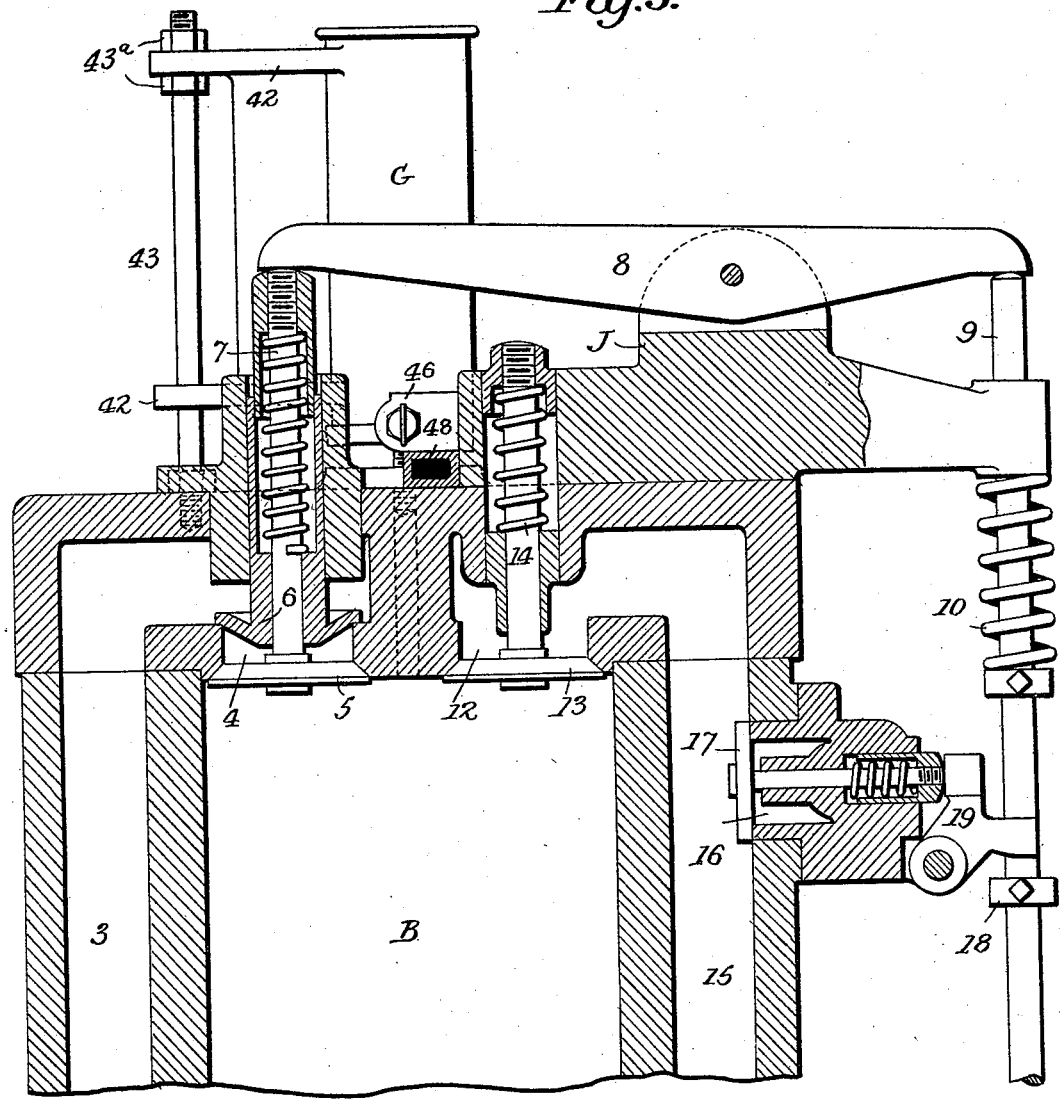
Figure 4:
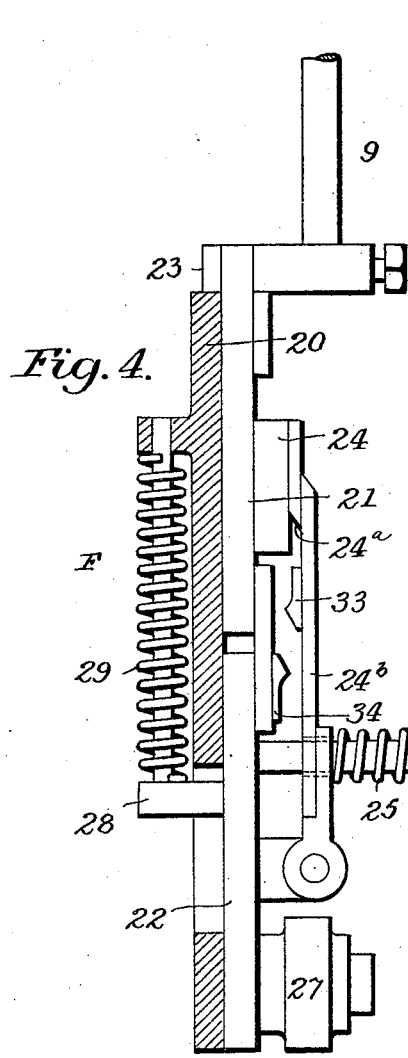
Figure 6:
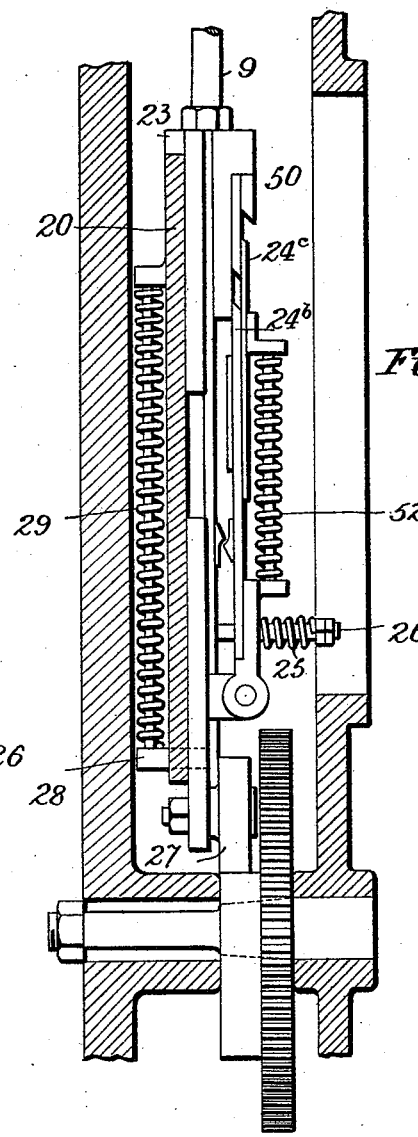
Figure 5:
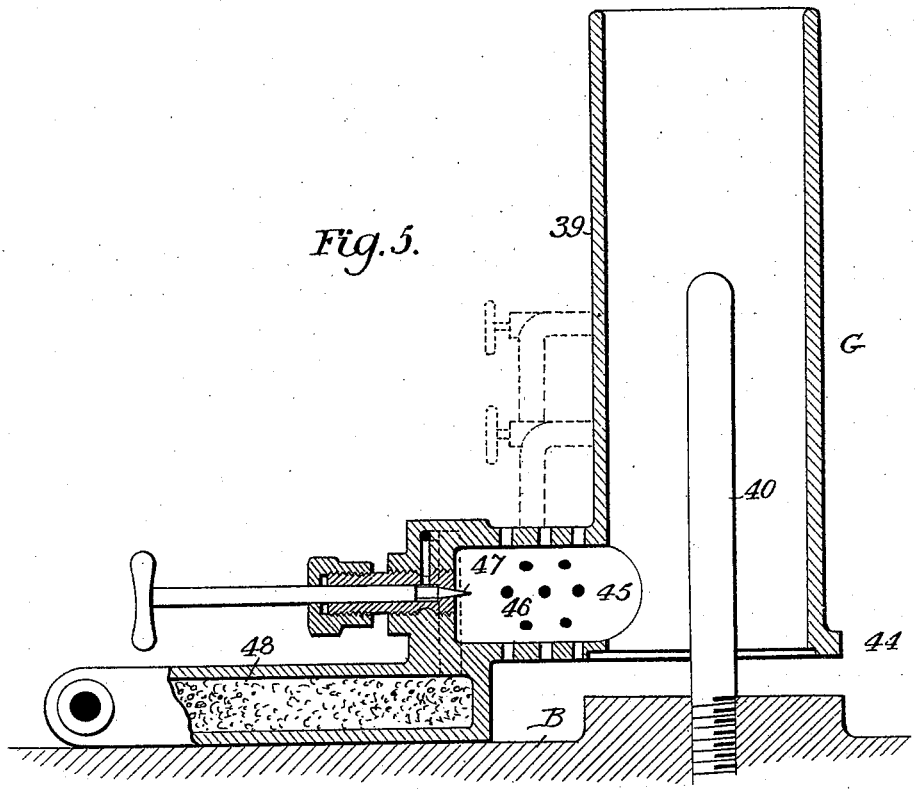
Figure 7:
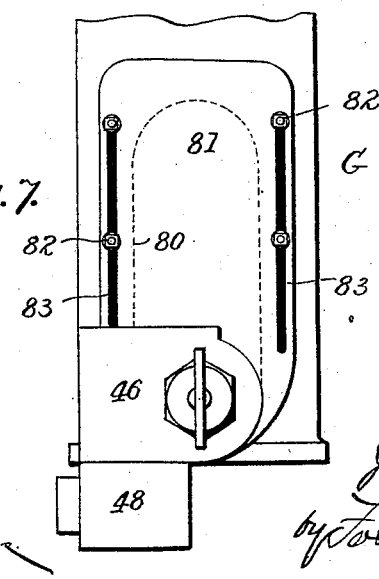

In the accompanying drawings, forming part of this specification, and in which like letters and numerals of reference indicate corresponding parts, Figure 1 is a side elevation of a gas-engine embodying my improvements. Fig. 2 is a longitudinal sectional view in the line $x$ $x$ of Fig. 1. Fig. 3 is an enlarged sectional view of a portion of the working cylinder, parts being broken away. Fig. 4 is a detail view of the governor. Fig. 5 is a sectional elevation of the igniter. Fig. 6 is a detail view of a modified form of governor, and Fig. 7 is a detail view of a modification of the igniter.

Any suitable frame may be employed to support the working parts of the engine, and the cylinder may be arranged thereon in either a vertical or horizontal position, it being shown in the present instance as vertically arranged.

A designates the frame of the engine, B the cylinder, provided with the usual water-jacket, and C the crank-shaft, connected to the piston within the cylinder by means of a connecting-rod D. These parts are so constructed, arranged, and operated that in normal operations as the piston E is on its forward stroke it draws a charge of gas and air through the inlet-port 12 into the combustion-chamber, where it is compressed upon the return or back stroke of the piston. The charge is then exploded, causing the piston to move forward and drive the crank-shaft C, and as the piston nears or arrives at the forward end of its stroke it uncovers an exhaust-port $z$, permitting a portion of the products of combustion to be discharged from the cylinder into the exhaust-passage 3. In the rear end of the cylinder is another exhaust-port 4, communicating with the exhaust-passage 3. This port is controlled by a spring-actuated check-valve 5, arranged to open outwardly from the cylinder-chamber, and by an inwardly-opening valve 6, held in its seat by spring action and adapted to be positively operated from a governor F (hereinafter described) through suitable intermediate connections. These intermediate connections may be variously constructed, and, as shown, the spindle 7 of the valve 6 is projected through the cylinder-head and bears upon one end of a centrally-pivoted lever 8, supported upon the head J. At its opposite end the lever 8 is engaged by a rod 9, supported to slide in bearings of the frame. This rod is normally held in its forward position by means of a spring 10, interposed between a fixed collar upon the rod and the supporting-bearing.

The cylinder B is provided with an air and gas inlet port 12, controlled by an inwardly-opening check-valve 13, held in its seat by means of a spring 14. The port 12 communicates with an air-passage 15, to which gas is admitted through a port 16, controlled by a valve 17, arranged to be opened against the action of a spring at each forward movement of the rod 9. This rod is provided with a stop 18, which engages one arm of a pivoted lever 19. The other arm of said lever bears upon the spindle of the valve 17 and serves to move it from its seat when the stop 18 actuates the lever 19.

The rod 9 is actuated from the crank-shaft by devices hereinafter described to normally move backward and open the valve 6 during each alternate backward stroke of the piston. As the piston next moves forward a further backward movement is imparted to the rod 9, which brings the stop 18 into contact with the lever 19 and opens the gas-inlet valve 17, permitting a charge to be drawn into the working cylinder through the air-passage 15 and inlet-port 12, the inlet-valve 13 being opened by the suction of the piston and the valve 5 closing the rear exhaust-port. After the piston has moved for about two-thirds of its stroke the rod 9 is moved forward, causing the gas-inlet valve 17 and the valve 6 to be closed, and as the piston completes its stroke all of the gas remaining in the air-passage is drawn into the cylinder and said passage freed from all explosive before the explosion of the charge in the cylinder takes place after the next back action of the piston.

The above operation is repeated during the time the engine is running at or below its normal speed. It is highly desirable, however, whenever the engine attains an excessive speed to automatically cut off the gas and air supply to decrease the speed of the engine and save power which would otherwise be wasted. To effect this, a governor F is employed to throw the rod 9 out of operation during the whole time the engine is running in excess of its normal speed and to cause the rod to be again actuated as soon as the speed falls to or below normal.

As shown, the governor comprises a support 20 upon the frame and two moving parts 21 22, supported and adapted to move upon the support 20. The moving part 21 is connected to the rod 9 and is provided with a bearing 24, having a shoulder $24^a$, and with a stop 23, adapted to make contact with the support 20 to limit the forward movement of the rod. The moving part 22 is provided with a pivoted blade $24^b$, the free end of which is normally held in contact with the bearing 24 in position to engage with the shoulder $24^a$ of said bearing at each backward movement of the blade by means of a spring 25, arranged intermediate the head of a stud 26 and the outer face of the blade. The part 22 is also provided with a friction-roll 27 and a lug 28, the latter of which is engaged by a spring 29 to hold said friction-roll against the face of a cam 30, driven from the crank-shaft C by means of intermediate gears 31 and 32, which rotate the cam once during each two revolutions of the crank-shaft. It will be evident that from this arrangement the rod 9 will be reciprocated so long as the blade $24^b$ remains in contact with the shoulder $24^a$, which will be as long as the engine runs at or below its normal speed. Means are provided, however, for lifting the blade so that it will not make contact with the shoulder when the engine's speed is in excess of what it should be. As shown, the blade $24^b$ is provided with an engaging piece 33, having, preferably, a curved and an inclined face adapted to make contact with and ride over a similar engaging piece 34 upon the support 20 of the governor at each reciprocation of the blade $24^b$. The two engaging pieces 33 34 are arranged in reverse relation to bring their curved faces together at each outward movement of the blade $24^b$ and to bring their inclined faces together at each backward movement of said blade.

The moving part 22, which carries the blade $24^b$, is permitted to move rearwardly a greater distance than the part 21, which has the effect of withdrawing the blade from contact with the shoulder $24^a$ of the bearing 24, and causes the inclined face of the piece 33 to ride upon that of the stationary engaging piece 34 and assume a position in the rear of said piece 34. At the next forward movement of the slide $24^b$ the curved face of the piece 33 will make contact with that of the stationary piece 34 and ride over it, causing the blade to be lifted against the action of the spring 25. Now if the speed of the engine at the time the engaging pieces make contact is normal or below normal, the force of such contact will not be sufficient to cause the blade to be lifted so far as will prevent the spring 25 returning it in time to engage the shoulder $24^a$. Consequently the blade will drop into engagement with said shoulder and the moving part 21 and the rod 9 will be moved backward and the exhaust and gas-inlet valves actuated in the manner hereinbefore described. If, however, at the time of the contact of the engaging pieces 33 34 the engine is running in excess of its normal speed, the force of such contact will be so great and the backward movement of the blade so much accelerated that the blade will be thrown out too far to return in time to engage the shoulder, and it will drop and slide upon the outer face of the bearing 24, arranged in advance of the shoulder, and thus the movement of the part 21 and rod 9 will fail to be effected and the rear exhaust and gas-inlet valves remain closed.

In the modified form of governor shown in Fig. 6 the parts and operation are identical with those above described with some additions. The bearing 50 of this modification, instead of one shoulder, is provided with two, one being arranged in advance of the other, and the blade $24^b$ is provided with an auxiliary blade $24^c$, sliding upon the blade $24^b$ and having its end held in advance thereof by means of a spring 52. In operation, when the blade $24^b$ is moved forward in the direction of the bearing 50 the auxiliary blade will come into engagement with the primary shoulder, and if it should catch on the extreme point of said primary shoulder it can slide back and compress spring 52 without effecting the forward movement of the blade $24^b$, but if it should drop below the extreme point of said primary shoulder it will be drawn in by the taper of the primary shoulder and blade and tension of spring 52, and blade $24^b$ will be in full contact with shoulder $24^a$ before any work is put upon it. This construction is very desirable in the larger engines, when the duty imposed upon shoulder $24^a$ and blade $24^b$ is great, to prevent the points from battering or chipping.

It will be evident that in both forms of governor illustrated in Figs. 4 and 6, respectively, the stationary part may be dispensed with and the moving parts may be mounted directly upon the frame. Other changes in arrangement and construction of the parts may also be made without departure from the essentials of the invention.

Any suitable igniter may be employed in connection with the above-described engine, but I prefer to make use of a tube-igniter such as I will now describe, it having in practical operation proved very effective.

The igniting-tube 40, which is closed at its upper end and may be of metal, porcelain, &c., is arranged to extend vertically through an ignition-port formed in the working cylinder. This tube is surrounded by a heater or blast-furnace G, supported by means of brackets 42 upon a vertical screw-threaded rod 43, which has its lower end in a recess in the cylinder and is provided with nuts 43ª for adjusting the heater. The furnace consists of a casing 39, open at its top and provided with a base 44, immediately above which is formed an opening 45, communicating with a chamber 46, provided with air-openings and having seated therein a vapor-injecting nozzle 47, with which communicates a vaporizer 48, in turn connected with a suitable source of fluid-supply.

In operation the vaporized oil and air are mixed within the chamber 46 and passes through the opening 45 into the casing 39 when the flame is definitely directed against the ignition-tube, which it heats sufficiently to ignite the charge in the working cylinder. After each explosion the igniting-tube 40 will be filled with spent gases, so there is no danger of the discharge of a fresh charge when first admitted when the piston is in its forward position; but as the piston moves backward it compresses the previously-admitted charge and the spent gases in the ignition-tube, so that the fresh gases are forced into the tube to the ignition-point and ignited to explode the charge in the cylinder. It is necessary that this explosion shall not take place prematurely or before the piston reaches the limit of its backward stroke, as it would cause the crank-shaft to be driven backward. All liability of this may be obviated with the above-described igniter by moving the furnace G longitudinally of the igniting-tube to direct the flame against the tube at the desired point. This is effected by adjusting the nuts 43ª upon the screw-thread rod 43, it being apparent that the farther the ignition-point is removed from the cylinder the greater the time between the compression and explosion of the charge in the cylinder, and vice versa.

The vaporizer 48, which may be of any suitable construction, in the present instance is in the form of a tube, which is preferably filled with a suitable heat-absorbing material, such as gravel, metal turnings, &c. This vaporizer is arranged in such close proximity to the heater or blast-furnace as to be heated sufficiently thereby to vaporize the oil before it reaches the burner, thus dispensing with the use of a separate heater for the vaporizer.

Various means may be employed for effecting the adjustment of the furnace longitudinally of the igniting-tube, as, for instance, there may be a vertical series of vapor-nozzles and mixing-chambers, as indicated in dotted lines, Fig. 6, which are so arranged that a flame may be directed through any one of said nozzles. Again, the casing 39 may be fixed stationary upon the cylinder B and be provided with a longitudinal slot 80, in which the heater, which in all the constructions may be either a blast-furnace or an ordinary gas or oil flame, may be adjusted to bring it opposite any point of the igniting-tube. This arrangement is shown in Fig. 7. The means for adjusting the heater, which consist of a stationary screw-threaded rod 81, upon which a recessed lug 82, extending from the heater, is adjusted by nuts 83.

Without limiting myself to the precise construction and arrangement of parts shown and described, I claim as my invention—

1. In a gas-engine the combination with a gas-inlet valve, of a governor comprising a support provided with an engaging piece and two movable parts, one carrying a shouldered bearing and the other a pivoted blade engaging the shoulder of the bearing and having an engaging piece adapted to make contact with the stationary engaging piece to throw the blade out of engagement with the shoulder of the bearing when the speed of the engine is above normal, a cam operated from the crank-shaft for actuating the movable part carrying the pivoted blade and means on the other movable part for limiting its backward movement, substantially as described.

2. In a gas-engine, the combination with a gas-inlet valve, of a governor therefor comprising a stationary engaging piece and two movable parts, a shouldered bearing on one of said parts, and a pivoted spring-pressed blade and a friction-roll upon the other of said parts, said blade being adapted to engage the shouldered bearing, a cam and its operating means adapted to engage the friction-roll, and means for maintaining the said roll in contact with the cam, substantially as described.

3. In a gas-engine, the combination with a valve, of a governor therefor comprising two movable parts, one of which is provided with shoulders, and the other with pivoted blades adapted to engage the shoulders, one of said blades having a yielding connection with the other and having its end extending in advance of the end thereof, means for positively reciprocating one of the movable parts, and devices for shifting the pivoted blades laterally to move the same into and out of contacting position with the shoulders, substantially as described.

In testimony whereof I have signed my name to this specification in the presence of two subscribing witnesses.

WALKER LEE CROUCH.

Witnesses:
E. H. THOMAS,
IRVIN K. CAMPBELL.